United States Patent
Wong et al.

(10) Patent No.: US 9,453,950 B2
(45) Date of Patent: Sep. 27, 2016

(54) PHOTOCHROMIC COATING PROCESS

(75) Inventors: Kathy Wai Yuen Wong, Hallett Cove (AU); David Andrew Lewis, Marion (AU); Fang Chen, Hallett Cove (AU); Bohdan Grzegorz Cieslinski, Hallett Cove (AU); Huan Kiak Toh, Fullarton (AU)

(73) Assignee: CARL ZEISS VISION AUSTRALIA HOLDINGS LTD., Londsdale (AU)

( * ) Notice: Subject to any disclaimer, the term of this patent is extended or adjusted under 35 U.S.C. 154(b) by 841 days.

(21) Appl. No.: 13/211,936

(22) Filed: Aug. 17, 2011

(65) Prior Publication Data

US 2012/0037859 A1    Feb. 16, 2012

Related U.S. Application Data

(62) Division of application No. 10/498,744, filed as application No. PCT/AU02/01691 on Dec. 13, 2002, now abandoned.

(30) Foreign Application Priority Data

Dec. 14, 2001    (AU) ........................................ PR9492

(51) Int. Cl.
*G02B 5/23*       (2006.01)
*B29D 11/00*    (2006.01)

(52) U.S. Cl.
CPC ............. *G02B 5/23* (2013.01); *B29D 11/0073* (2013.01)

(58) Field of Classification Search
USPC ............ 264/1.1–2.7; 351/163–166; 427/2.24
See application file for complete search history.

(56) References Cited

U.S. PATENT DOCUMENTS

| | | | |
|---|---|---|---|
| 4,043,637 A | * | 8/1977 | Hovey ........................ 359/241 |
| 4,544,572 A | | 10/1985 | Sandvig et al. |
| 4,774,035 A | | 9/1988 | Carmelite et al. |
| 4,800,123 A | | 1/1989 | Boeckeler |
| 5,049,321 A | | 9/1991 | Galic |
| 5,079,319 A | | 1/1992 | Mueller |
| 5,306,799 A | | 4/1994 | Kobayashi et al. |

(Continued)

FOREIGN PATENT DOCUMENTS

| | | |
|---|---|---|
| GB | 2096130 | 10/1982 |
| WO | WO 95/09724 | 4/1995 |

(Continued)

OTHER PUBLICATIONS

International Search Report for corresponding application PCT/AU2007/000607, completed Jun. 18, 2007.

*Primary Examiner* — Jodi C Franklin
(74) *Attorney, Agent, or Firm* — Buchanan Ingersoll & Rooney PC

(57) ABSTRACT

The present invention provides a method for manufacturing a photochromic article having a photochromic compound containing layer. The method includes the step of coating a casting face of at least one mold section with a photochromic host layer. The photochromic host layer is treated to minimize damage during subsequent steps, and a mold is then assembled so that it includes the mold section having the photochromic host layer. The mold is then filled with a photochromic article monomer composition and the monomer composition is subsequently cured to form a photochromic article substrate adhered to the photochromic host layer. The photochromic compound is introduced into the photochromic host layer.

23 Claims, 1 Drawing Sheet

(56) References Cited

U.S. PATENT DOCUMENTS

| | | | |
|---|---|---|---|
| 5,523,030 A * | 6/1996 | Kingsbury | 264/1.7 |
| 5,531,940 A * | 7/1996 | Gupta et al. | 264/1.7 |
| 5,608,115 A | 3/1997 | Okazaki et al. | |
| 5,770,115 A * | 6/1998 | Misura | 252/586 |
| 5,807,975 A | 9/1998 | Amagai et al. | |
| 5,811,503 A | 9/1998 | Herold et al. | |
| 5,851,585 A * | 12/1998 | Gupta et al. | 427/162 |
| 5,880,171 A * | 3/1999 | Lim et al. | 523/106 |
| 5,882,556 A | 3/1999 | Perrott et al. | |
| 5,914,174 A * | 6/1999 | Gupta et al. | 428/174 |
| 5,977,276 A | 11/1999 | Toh et al. | |
| 6,113,814 A * | 9/2000 | Gemert et al. | 252/586 |
| 6,166,158 A | 12/2000 | Toh et al. | |
| 6,300,464 B2 | 10/2001 | Morijiri et al. | |
| 6,313,251 B1 | 11/2001 | Toh et al. | |
| 2001/0038890 A1 * | 11/2001 | Buazza et al. | 428/1.1 |
| 2002/0076549 A1 | 6/2002 | Welch et al. | |
| 2002/0196408 A1 | 12/2002 | Bhalakia et al. | |
| 2003/0116872 A1 | 6/2003 | Klemm et al. | |
| 2004/0125335 A1 | 7/2004 | Vu | |
| 2005/0171231 A1 | 8/2005 | Diggins | |
| 2009/0189303 A1 | 7/2009 | Diggins et al. | |

FOREIGN PATENT DOCUMENTS

| | | | |
|---|---|---|---|
| WO | WO 95/15845 | 6/1995 | |
| WO | WO 9515845 A1 * | 6/1995 | B29D 11/00 |
| WO | WO 01/10635 | 2/2001 | |
| WO | WO 01/21375 | 3/2001 | |
| WO | WO 01/49478 | 7/2001 | |
| WO | WO 01/72851 | 10/2001 | |
| WO | WO 03/052011 A1 | 6/2003 | |

* cited by examiner

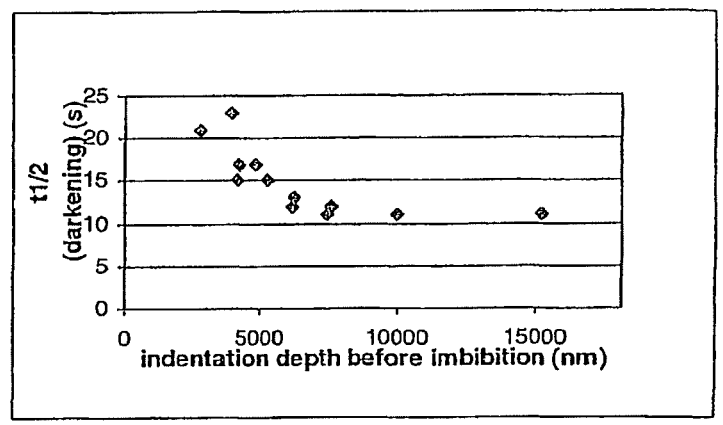

PHOTOCHROMIC COATING PROCESS

FIELD OF THE INVENTION

The present invention relates to methods for manufacturing photochromic articles that have host layers including photochromic compounds. In one specific form, the invention relates to a method for manufacturing plastic ophthalmic lenses with a host layer including a photochromic compound.

The present invention also relates to processes for adjusting the transition times of photochromic compounds contained in host layers of photochromic articles.

BACKGROUND OF THE INVENTION

Photochromic articles that incorporate photochromic compounds have been known for some time. In particular, many ophthalmic lenses contain photochromic compounds so that when they are exposed to light of a particular wavelength, such as actinic radiation (sunlight), the compound changes from a transparent ground state to a coloured activated state in which the lens is able to filter out at least some of the incident light. The transition from the ground state to the activated state is reversible. Therefore, whilst the photochromic compounds remain exposed to incident light, they remain in the activated state. However, once the source of light is removed, the compounds relax to the ground state in which they are colourless or minimally coloured.

Ophthalmic lenses having a photochromic capacity have been found to be particularly suitable for glasses so that in artificial light the lenses remain transparent, but as a wearer moves into sunlight the lenses darken and reduce the amount of transmitted light. Such lenses are typically formed by including a photochromic compound within the substrate of the lens or on a surface of the lens.

The advent and widespread adoption of ophthalmic lenses formed from plastic materials has meant that new processes have had to be developed to permit photochromic compounds to be used. Typically this is done either by imbibing a photochromic compound directly into the lens substrate, or by coating the lens with a layer containing a photochromic compound.

However, with some known methods of introducing photochromic compounds into plastic articles such as ophthalmic lenses it is difficult to control the extent to which the photochromic compound passes into the article substrate, and/or it is difficult to incorporate sufficient of the photochromic compound into the article substrate or the coating. In addition, some article substrates provide a hostile environment for photochromic compounds because they constrain the transition of the compound from the ground to the activated state and/or they cause fatigue in the photochromic compound.

Additionally, there is a need to provide photochromic ophthalmic lenses in which the transition time between the coloured activated state and the transparent ground state is as short as possible so that the photochromic article reacts as rapidly as possible to any change in lighting conditions.

SUMMARY OF THE INVENTION

The present invention provides a method for manufacturing a photochromic article, the method including the steps of:
forming a photochromic host layer on the casting face of at least one mould section,
treating the photochromic host layer to minimise damage during subsequent steps,
filling an assembled mould that includes the mould section having the photochromic host layer with a substrate monomer composition,
curing the substrate monomer composition to form a solid article that includes the photochromic host layer, and
introducing a photochromic compound into the photochromic host layer to form the photochromic article.

BRIEF DESCRIPTION OF DRAWING

FIG. 1 is a graph showing darkening time as a function of nanoindentation depth according to an embodiment of the lens disclosed herein.

DETAILED DESCRIPTION OF SPECIFIC EMBODIMENTS

The present invention also provides photochromic articles, and especially photochromic ophthalmic lenses, that are formed using the method of the present invention.

For discussion purposes, reference will be made to photochromic articles in the form of plastic ophthalmic lenses in the further description of the invention. However the methods of the present invention are not to be taken as being limited to that particular application and it is envisaged that the methods can be used to produce a variety of plastic articles that include photochromic compounds.

The 'photochromic host layer' of the present invention is a coating layer that is capable of hosting photochromic compounds. Generally, the photochromic host layer will not have any photochromic properties until photochromic compounds have been introduced into the host layer.

In one specific form of the invention, both the photochromic host layer and cured substrate monomer composition are polymers, however, the polymers are preferably different and the photochromic host layer is preferably more readily imbibable with photochromic compound than is the cured substrate monomer composition.

The photochromic host layer is preferably between about 10 microns and about 150 microns in thickness. The host layer may be formed by coating the casting face with a solution of host layer monomer or with neat liquid host layer monomer using any of the techniques that are used for that purpose in the art, such as dip coating, spin coating, flow coating and spray coating.

Preferably, the casting face is coated by spin coating a neat host layer monomer solution, or in the case of a relatively viscous monomer, a solution of host layer monomer in a suitable solvent. Spin coating may be preferred to other coating techniques because spin coating generally provides more control over the coverage of the casting face, and the thickness and uniformity of the thickness of the host layer can also be controlled. For this reason, the viscosity of the host layer monomer solution may affect the coating process. For example, non-viscous monomers (less than about 10 cp) will generally not provide a photochromic host layer that is of 10 to 150 micron thickness. Similarly, very viscous monomers may provide a photochromic host layer that is too thick, although in that instance the viscosity can be reduced using an appropriate solvent. In one example the casting face of the mould section may be spin coated at less than 1000 rpm with a host layer monomer composition having a viscosity of about 80 cp.

Preferably, the casting face for a front optical lens surface is coated with the photochromic host layer. Preferably also, substantially all of the casting face is coated with the photochromic host layer. Further, it is also preferable for the photochromic host layer to be applied with a relatively uniform thickness across the casting face.

Ideally, the photochromic host layer is applied so that it replicates the mould surface from which the lens is to be made and thereby provides an optical surface having the desired surface configuration that is substantially free from surface aberrations that may arise due to non-uniformity of the thickness of the photochromic host layer, flow marks and coating build up.

After the casting face has been coated with the monomeric photochromic host layer composition, the layer is treated to prevent damage during subsequent steps. This treatment may include at least partially curing the host layer, or alternatively, evaporating solvent from the host layer. If the host layer includes a solvent, the solvent removal preferably occurs either in concert with the partial curing or as, a separate process that is conducted prior to the partial curing. Solvent removal may be achieved by air drying or by the use of infra-red radiation, microwave radiation or heat.

The treatment step preferably prevents damage such as lifting, delamination, dissolution and/or excessive swelling of the photochromic host layer. However, the photochromic host layer monomer is preferably only partially cured so that there is some interpenetration of the photochromic host layer composition with the substrate monomer composition to allow good adherence between the photochromic host layer and the substrate in the moulded article. Additionally, intermixing between the substrate monomer composition and the photochromic host layer may provide a diffuse interface of 2 to 5 microns thickness between the host layer and the article substrate which may reduce or eliminate interference patterns.

Additionally, it may be preferable to partially cure the photochromic host layer and to complete the cure either during or after the photochromic compound has been introduced into the host layer. In this way, it is thought that the photochromic compounds are able to diffuse into the host layer and create space within the host layer before it is fully cured. Once the photochromic host layer is fully cured, it may be too hard for the photochromic compounds to penetrate sufficiently.

Optionally, in cases where the substrate monomer composition forms a substrate that is not imbibable with photochromic compounds it may be necessary to apply a barrier layer to the photochromic host layer before the mould is filled with the substrate monomer composition so that the barrier layer minimises interpenetration of the substrate monomer into the photochromic host layer. Interpenetration or breakthrough of the substrate monomer composition into the host layer in that case could affect the properties of the photochromic host layer and hence the transition time of the photochromic compound. A barrier layer may also prevent penetration of photochromic compounds into the article substrate. However, preferably the barrier layer does not substantially affect adherence between the photochromic host layer and the lens substrate. For example, barrier layers may be formed from a thin layer of highly cross linked polymeric material. Suitable barrier layers may be formed by polymerising a composition that includes a compound containing double bonds and a compound containing thiol groups. Alternatively, the barrier layer may be formed by polymerising a composition that includes a compound containing isocyanate groups and a compound containing thiol, hydroxy, aromatic amine or other nucleophilic groups.

The use of a barrier layer may article substrates that are not normally imbibable with photochromic compound to be used. Examples of such substrate materials include highly crosslinked polymers such as MR-6, MR-7, MR-8, MR-10, CR-39 and episulfides. Typically, these polymers are too rigid to be readily imbibable with photochromic compounds and as a consequence they are traditionally difficult to use on photochromic articles. Also, some of these polymers have a high sulphur content which can detrimentally affect the life of the photochromic compound. However, the application of a barrier layer and/or the minimisation of mixing of the substrate monomer composition with the photochromic host layer means that impact of the substrate monomer composition on the imbibability of photochromic compounds into the photochromic host layer is reduced.

Photochromic compounds can be attacked by the substrate monomer composition during curing by reaction with the polymerisation initiator, reaction with the catalyst or an additive in the monomer formulation and by reaction with a component of the substrate monomer composition (such as an isocyanate). Additionally, over time, the dye can suffer from excessive fatigue if the monomer composition has significant sulphur content.

The use of a barrier layer overcomes these issues by preventing the interpenetration of the monomer composition into the photochromic host layer.

Since the barrier layer is preferably thin and cured in a rapid manner, interpenetration of the barrier layer can be minimised. This then affords the opportunity to introduce the photochromic compound into the photochromic host layer before coating the photochromic host layer onto the mould surface or at sometime after the initial coating but before filling the moulds with monomer composition and ensure that (i) any initiators in the monomer composition will not destroy the photochromic compound, and (ii) excessive dye fatigue caused by the interpenetration of photochromic dye hostile monomer compositions into the photochromic host layer is minimised.

Preferably, the composition of the host layer is selected to provide an environment in which the effect of the host layer on the transition of the photochromic compound between the activated and the ground states is minimised. In this way, the transition time of the photochromic compound between the ground and activated states may also be optimised. Clearly, the more rapid the transition between ground and activated states, the more rapid the lightening or darkening of the photochromic article when moving out of or into sunlight.

Without intending to be bound by theory, it is thought that under normal conditions, photochromic compounds reach a steady state that is a balance between the number of photons incident upon the photochromic host layer, and the number of photochromic compound molecules in the activated state. To overcome the steady state, the present inventors believe that it is favourable to have a higher number of photochromic compound molecules in the host layer so that more of the incident photons are consumed and the steady state is shifted in favour of the photochromic compound molecules being in the activated state. Using the method of the present invention it is possible to form photochromic host layers having a thickness that allows sufficient photochromic compound molecules to be incorporated into the layer to beneficially affect transition times.

Additionally, the present inventors also believe that there is a depth in a photochromic host layer beyond which light of an activating wavelength (usually about 395 nm) does not penetrate and therefore any photochromic compound molecules beyond this depth will not be activated. Accordingly, to minimise the transition time, the photochromic host layer preferably has a thickness of between 10 and 150 microns, more preferably 25 to 60 microns, and most preferably about 30 to 50 microns.

The composition of the photochromic host layer may also affect the transition time of the photochromic compounds in the host layer. Thus, the local rigidity of the host layer surrounding the photochromic compound molecules, and/or the polarity of the photochromic host layer in the vicinity of the photochromic compound molecules may affect the transition time. Specifically, it is thought that a relatively polar photochromic host layer stabilises the activated state (which is likely to be ionic) of the photochromic compound molecules and ultimately increases the activated to ground state transition times. Accordingly, a relatively non-polar photochromic host layer may contribute to fast transition times, whereas a relatively polar photochromic host layer may contribute to slow transition times.

Similarly, the rigidity of the photochromic host layer in the vicinity of the photochromic compound molecules may also affect the transition time. Specifically, it is thought that a relatively rigid local environment slows the transition of the photochromic compound molecules by limiting flexibility and room for the molecule to enter the activated state. Conversely, a relatively non-rigid or 'soft' local environment is thought to allow sufficient flexibility and room for the photochromic compound molecules to move into the activated state.

Accordingly, to provide for a photochromic article that has a fast transition time, the photochromic host layer is preferably relatively soft (when polymerised). For the purposes of the present invention, a 'relatively soft' polymer may have a glass transition temperature (Tg) of less than about room temperature.

However, in use, it may be found that such a photochromic host layer is physically vulnerable, and in particular is easily abraded because of its softness, and therefore the selection of a material for use in the photochromic host layer will generally also have to take into account physical parameters that favour a higher Tg. In practice, a 'relatively soft' photochromic host layer may be formed from any monomer that forms a polymer having a Tg that is about 40 deg C. or higher.

It may be possible to quantify the softness of the photochromic host layer and correlate this with the transition time of a lens. Thus, the surface hardness of the photochromic host layer of the photochromic article may be used as a guide to the transition times expected. The hardness of the photochromic host layer may be measured using a nanoindenter.

By way of example, suitable photochromic host layer monomers may be selected from any one or more of the list including: alkylene di(meth)acrylates, such as decanediol diacrylate; poly(alkyleneoxide) di(meth)acrylates such as A200 (polyethylene glycol 200 diacrylate), A400 (polyethylene glycol 400 diacrylate), A600 (polyethylene glycol 600 diacrylate), APG-200 (tripropylene glycol diacrylate), APG-400 (polypropylene glycol 400 diacrylate), 14G, 9G and 4G; urethane (meth)acrylates such as U-4HA and U-6HA; and allyl compounds such as DAIP.

Particularly preferred photochromic host layer monomers are nonaethylene glycol dimethacrylate containing compositions such as 9G, quatdecaethylene glycol dimethacrylate containing compositions such as 14G, polytetramethylene glycol and ethoxylated bisphenol-A dimethacrylate (having between 1 and 20 ethoxy groups per molecule). The photochromic host layer monomer may also be a mixture of any two or more of the listed photochromic host layer monomers. As used herein, the term (meth)acrylate is used to denote either an acrylate or a methacrylate group. Thus, a di(meth)acrylate monomer may contain one acrylate and one methacrylate group, two acrylate groups or two methacrylate groups.

Using the methods of the present invention, it is possible to prepare lenses that have transition times that are significantly faster than commercially available photochromic lenses that are known to the present inventors. As a result, there may be some instances where the transition times are too fast and it may be either necessary or preferred to suppress the transition time. For instance, on occasions in which a wearer moves from shadow to light and back to shadow, it may be preferable for the lenses not to react rapidly to the change in light, but rather for the transition to be buffered somewhat so that the lenses do not undergo a series of rapid transitions.

Using the methods described herein it is possible to tune or selectively adjust the transition time of a photochromic compound in a photochromic host layer. As discussed previously, the rigidity of the photochromic host layer in the vicinity of the photochromic compound molecules may affect the transition time, and it is thought that a relatively rigid local environment slows the transition of the photochromic compound molecules by limiting flexibility and room for the molecule to enter the activated state. Similarly, for reasons discussed earlier a relatively polar environment in the vicinity of the photochromic compound molecules may slow the transition times.

Accordingly, the present invention also provides a method for manufacturing a photochromic article wherein physical and/or chemical properties of a photochromic host layer can be adjusted to alter the transition time of photochromic compounds contained in that layer, the method including the step of adjusting one or more of the polarity and/or the local rigidity of the photochromic host layer to either increase or decrease the transition time of the photochromic compounds.

It will be appreciated that, until the method of the present invention was discovered, it was not possible to achieve transition times that were sufficiently fast that one would need to deliberately slow them down. However, the separation of the photochromic compound environment from the optical and mechanical properties of the lens substrate, such fast transition times have been achieved with the present invention. It is also possible that other methods may ultimately be discovered that provide lenses having very fast transition times. Accordingly, the method of adjusting the transition time discussed herein may also be used in lenses having fast transition times that are produced using method other than the methods described herein.

For the purposes of the present invention, the photochromic host layer monomer may also be a mixture of any two or more photochromic host layer monomers wherein the photochromic host layer includes a major proportion of a soft polymer, such as an ethyleneglycol dimethacrylate such as 9G, that is modified with a minor proportion of a hardening monomer to provide some rigidity when cured. In particular, hardening monomers such as relatively rigid urethane acrylates (eg. U-4HA or U-6HA), ethoxylated bisphenol-A dimethacrylate monomer having between 1 and 20 ethoxy groups per molecule or isocyanurate based poly (meth)acrylate monomers may be added in amount of 1 to 35%, and preferably 5 to 15%, to 9G to form a photochromic host layer in which the transition time of the photochromic compound in the coating is slowed or suppressed by the addition of the urethane acrylate.

DETAILED DESCRIPTION OF THE INVENTION

The basic in-mould coating process that forms part of the method of the present invention is preferably similar to the one described in International patent application PCT/AU00/01152, which is incorporated herein by reference solely for the purpose of exemplifying in-mould coating processes.

Briefly, the in-mould coating process typically involves coating the mould section casting face with the photochromic host layer monomer composition as a neat monomer solution. Alternatively, the monomer solution may be in a suitable solvent such as methyl acetate or methylene chloride. The photochromic host layer monomer composition may be applied by a variety of techniques including spraying, dipping, brushing, flow coating, spin coating and the like. However, spin coating is preferred. The photochromic host layer monomer composition may then be partially cured, for example by UV initiated partial polymerisation. The degree of polymerisation may be controlled as described in PCT/AU00/01152.

The moulds used in the manufacture of lenses from polymeric materials are generally made from glass or metal and typically have first and second mould sections which are mounted in a gasket to form the front and back optical surfaces on the lenses. At least one of the mould sections has a surface that forms a finished optical surface. Depending upon the particular application, a permanent or semi-permanent treatment may be applied to facilitate mould release.

After coating the mould section with the photochromic host layer composition and partial curing and/or solvent removal, the mould pieces are fitted together to form a mould cavity that is coated with the photochromic host layer in a partially cured form. Plastics forming substrate monomer is then poured into the mould and the plastic is cured in the usual way. The moulded lens is finally removed from the mould to provide the lens coated with the photochromic host layer.

For ease of polymerisation, the photochromic host layer monomers preferably contain an alkene moiety that is able to undergo free radical polymerisation. Acrylate or methacrylate moieties are particularly suitable for this purpose.

Curing or partial curing of the photochromic host layer may be initiated using suitable polymerisation initiators, including any of the suitable thermal and/or chemical initiators known in the art, and the degree of polymerisation may be controlled by selecting an appropriate amount of initiator, as is described in PCT/AU00/01152. For photochromic host layer monomers that undergo free radical polymerisation, suitable initiators are compounds that liberate or generate a free-radical on addition of energy. Such initiators include peroxy, azo, and redox systems each of which are well known and are described in polymerisation art.

Included among the free-radical initiators are the conventional heat activated initiators such as organic peroxides and organic hydroperoxides. Examples of these initiators are benzoyl peroxide, tertiary-butyl perbenzoate, cumene hydroperoxide, azo-bis(isobutyronitrile) and the like.

The preferred initiators for the photochromic host layer are photopolymerisation initiators. Included among such initiators are acyloin and derivatives thereof, such as benzoin, benzoin methyl ether, benzoin ethyl ether, benzoin isopropyl ether, benzoin isobutyl ether, and .alpha.-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N,N-dimethyldithiocarbmate; phenones such as acetophenone, .alpha.,.alpha.,.alpha.-tribromacetophenone,.alpha.,.alpha.-diethoxyacetophenone, .alpha.,.alpha.-dimethoxy-.alpha.-phenylacetophenone, o-nitro-.alpha.,.alpha.,.alpha.-tribromacetophenone, benzophenone, and p,p'-bis(dimethylamino)benzophenone; aromatic iodonium and aromatic sulfonium salts, sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide, and p-acetamidobenzenesulfonyl chloride.

When the photochromic host layer is to be cured or partially cured using a radical polymerisation initiator, the mould coating and curing steps are beneficially conducted in an environment containing minimal oxygen so as to minimise oxygen inhibition of polymerisation. The amount of polymerisation initiator used and the conditions of polymerisation will be readily determined by those skilled in the art, or can easily be determined empirically. Throughout this specification, reference to the partial curing of the photochromic host layer is to be understood to mean reference to at least partially curing the photochromic host layer, and also encompasses the possibility of complete curing of the photochromic host layer, if this is required.

Once the photochromic host layer has been cured to a desired level, the mould is preferably assembled and filled with the substrate monomer composition to provide the solid lens substrate. Optionally, a barrier layer is applied to the host layer before the mould is assembled. The substrate monomer composition for forming the lens may be any of the thermosetting materials known in the art for that purpose. Preferably, the lens substrate material is capable of solidifying to form a room-temperature stable, optically clear lens. Examples of thermosetting materials that may be used include allyl diglycol carbonate monomer (also known commercially as CR-39), acrylate monomers, and acrylate oligomers, thiourethanes, combinations of multifunctional thiols with acrylates, etc. SPECTRALITE™ (a trade mark of Sola International Inc) is particularly preferred because it is rapidly cured by photopolymerisation and therefore the monomer composition in a liquid form is in contact with the partially cured photochromic host layer for the minimum amount of time possible. In this way, diffusion of the monomer composition into the photochromic host layer, and vice versa, can be controlled.

Once the mould is filled, the substrate monomer composition is hardened using any suitable technique. For example, allyl diglycol carbonate may be hardened by subjecting it to heat in the range of 35° C. to 90° C. for up to 24 hours in an oven or in a series of waterbaths, according to a predetermined schedule in the presence of a suitable polymerisation agent. Once hardened, the cast lens is removed from the mould.

Optionally, the photochromic host layer may be post-reacted after the cast lens has been removed form the mould to ensure essentially complete curing of the photochromic host layer. However, the photochromic host layer is preferably not completely cured until after the photochromic compound has been introduced.

After the cast lens has been removed from the mould, and optionally post-reacted, the photochromic compound is introduced into the lens, preferably by being imbibed with a solution containing the photochromic compound. Suitable imbibition methods are disclosed in U.S. Pat. No. 5,882,556, which is incorporated herein by reference solely for the purpose of providing suitable methods. However, the photochromic compounds may also be incorporated into the lens by permeation or other transfer methods known to those skilled in the art.

Various classes of photochromic compounds are known and have been used in applications in which a sunlight-induced reversible colour change or darkening is desired. The most widely described classes of photochromic compounds are oxazines, pyrans and fulgides. Typically, the photochromic compounds have a visible lambda max of from 400 nm to 700 nm.

Examples of preferred photochromic compounds may be selected from the group consisting of:
1,3-dihydrospiro[2H-anthra[2,3-d]imidazole-2,1'-cyclohexane]-5,10-dione;
1,3-dihydrospiro[2H-anthra[2,3-d]imidazole-2,1'-cyclohexane]-6,11-dione;
1,3-dihydro-4-(phenylthio)spiro[2H-anthra-1',2-diimidazole-2,1'-cyclohexane-6,11-dione;
1,3-dihydrospiro[2-H-anthra[1,2-d]imidazole-2,1'-cycloheptane]-6,11-dione-1,3,3-trimethylspiroindole-2,3'-[3H]naphtho[2,1-b]-1,4-oxazine]
2-methyl-3,3'-spiro-bi-[3H-naphtho[2,1-bipyran](2-Me);
2-phenyl-3-methyl-7-methoxy-8'-nitrospiro[4H]-1-benzopyran-4,3'-[3H]-naphtho[2,1-b]pyran;
spiro[2H-1-benzopyran-2,9'-xanthene];
8-methoxy-1',3'-dimethylspiro(2H-1-benzopyran-2,2'-(1'H)-quinoline;
2,2'-spiro-bi-[2H-1-benzopyran];
5'-amino-1',3',3'-trimethylspiro[2H-1-benzopyran-2,2'-indoline;
ethyl-.beta.-methyl-.beta.-(3',3'-dimethyl-6-nitrospiro(2H-1-benzopyran-2,2'-indolin-1'-yl)-propenoate;
(1,3-propanediyl)bis[3',3'-dimethyl-6-nitrospiro[2H-1-benzopyran-2,2'-indoline];
3,3'-dimethyl-6-nitrospiro[2H-1-benzopyrao-2,2'-benzoxazoline];
6'-methylthio-3,3'-dimethyl-8-methoxy-6-nitrospiro[2H-1-benzopyran-2,2'-benzothiozoline];
(1,2-ethanediyl)bis[8-methoxy-3-methyl-6-nitrospiro[2H-1-benzopyran-2,2'-benzothiozoline];
N—N'-bis(3,3'-dimethyl-6-nitrospiro[2H-1-benzopyran-2,2' (3'H)-benzothioazol-6'-yl)decanediamide];
alpha.-(2,5-dimethyl-3-furyl)ethylidene(Z)-ethylidenesuccinicanhydride;
.alpha.-(2,5-dimethyl-3-furyl)-.alpha.',.delta.-dimethylfulgide;
2,5-diphenyl-4-(2'-chlorophenyl)imidazole;
(2',4'-dinitrophenyl)methyl]-1H-benzimidazole;
N—N-diethyl-2-phenyl-2H-phenanthro[9,10-d]imidazol-2-amine;
2-nitro-3-aminofluoren 2-amino-4-(2'-furanyl)-6H-1,3-thiazine-6-thione.

Optionally, a mixture of two or more of the photochromic compounds may be imbibed into the photochromic host layer. By using appropriate mixtures of photochromic compounds, it is possible to obtain specific activated colours such as a near neutral grey or brown.

It has been found that by using the method of the present invention and using conventional photochromic compounds, it is possible to form a lens in which the transition time for transition from the ground state to the activated state, or vice versa, is rapid. By way of example, the time for photochromic compounds to reach 50% of equilibrium intensity ($t_{1/2}$(activation)) in the fastest commercially available lens known to the inventors is about 25 seconds, whereas the $t_{1/2}$(activation) for a lens formed according to the present invention has been measured at about 10 seconds.

The method of the present invention may also include the step of applying subsequent layers over the photochromic host layer. For example, after the photochromic host layer has been imbibed with photochromic compound, it may be overcoated with an abrasion resistant layer. The over coat may be applied using any of the techniques that are used for that purpose in the art, including dip coating, spin coating, flow coating and spray coating. Optionally, the over coat may be a permeable layer and may be applied by in-mould coating so that the photochromic compound can be imbibed into the cast lens through the over coat. The over coat is preferably thin and preferably has a thickness in the range 0.8 to 10 microns, and most preferably 1 to 5 microns.

The method of the present invention may also be used to form a lens having a multi-layer coating with different amounts of photochromic compounds in each layer. In this way, a photochromic gradient may be formed in the coating. Thus, a first photochromic host layer may be applied using the process of the present invention. Subsequently, further photochromic host layers may be applied using any of the traditional coating techniques in the art or by applying a second layer over a partially cured first layer using the in-mould coating processes described herein. The subsequent layer may then be imbibed with a photochromic compound. The thickness of each of the photochromic host layers may be different so that different amounts of photochromic compound can be introduced into each layer. Alternatively, the rate of diffusion or imbibition may be controlled so that different amounts of compound are introduced into each layer.

The method of the present invention is thus capable of producing a photochromic article in the form of a lens having a photochromic coating on one or more of its optical surfaces. Optionally, the lens may also have an abrasion resistant coating.

DESCRIPTION OF EXAMPLES OF THE INVENTION

Examples of materials and methods for use with the processes of the present invention will now be provided. In providing these examples, it is to be understood that the specific nature of the following description is not to limit the generality of the above description.

In the examples, the following abbreviations are used.
NS110: bisphenol A ethoxylated dimethacrylate
9G and 14G: polyethylene glycol dimethacrylate
DATP: diallyl terephthalate
PTMG: polytetramethylene glycol diacrylate
U6HA: urethane monomer have 2-6 terminal acrylic or methacrylic groups
Irgacure 651: 2,2-dimethoxy-2-phenyl acetophenone
Terpinolene: 4-isopropylidene-1-methyl-cyclohexene
DHBP: 2,5-dimethylhexane-2,5-ditertbutylperoxide
NK Ester A-9200: tris (2-hydroxy ethyl) isocyanurate di and tri acrylate (45%-di/55% tri functional (mono);
NK Ester A-400: polyethylene glycol diacrylate
Lucirin TPO: (Diphenyl(2,4,6-trimethylbenzoyl)phosphine oxide)
GST: 1,2-bis(2-mercaptoethylthio)-3-mercaptopropane
Type S: bis(2-mercaptoethyl) sulphide dimethacrylate
TAIC: triallyl isocyanurate
Vicure 55: methyl phenyl glyoxylate 4G: tetraethylene glycol dimethacrylate*
9G: nonaethylene glycol dimethacrylate*
14G: quatdecaethylene glycol dimethacrylate*
* As is known, the polyethylene glycol dimethacrylates may be supplied as a mixture containg a range of ethylene chain lengths, but with the named compound in the majority.

Example 1

Table 1 shows a typical formulation that is used in the method of the present invention to produce ophthalmic lenses. A solution of the formulation was stirred for about an hour to allow complete dissolution of all components before degassing under vacuum for 30 mins. To obtain the in-mould coating, the solution was spin-coated onto the casting face with spinning speed at approximately 870 rpm. The coating was then UV cured (line speed=5 ft/min) and the mould sections were subsequently set into gaskets. The coated mould was then filled with the lens monomer composition and UV cured using two passes (one front and one back) at a line speed of 3.5 ft/min. The cured lenses were then imbibed for incorporation of photochromic compounds. The imbibition method was the same as that disclosed in U.S. Pat. No. 5,882,556.

TEM results showed that a coating with at least 20 μm thickness could be achieved.

TABLE 1

| Components | Amount (wt %) |
|---|---|
| Photochromic host layer monomer (9G) | 100 |
| UV 5411 | 0.025 |
| Tinuvin 765 | 0.05 |
| Blue dye | 0.03 |
| Irgacure 651 (photoinitiator) | 5.0[A] |

[A]The range of initiator of may be 2-5 wt %.

Table 2 shows the photopic intensity, $t_{1/2}$ (activation), the $t_{1/2}$ (fade), $t_{3/4}$ (fade) which is the equilibrium intensity reached after 15 minutes of continuous radiation, the time for the photochromic compounds to reach 50% of equilibrium intensity, the time for the photochromic compounds to fade back to 50% of equilibrium intensity and the time for the photochromic compounds to fade back to 25% of equilibrium intensity, respectively. It can be seen that the times achieved with lenses formed using the method of the present invention are much shorter than for a commercially available lens (Velocity™ which is available from SOLA International Inc. and is a cast lens which is later imbibed after curing).

TABLE 2

| Lens photochromic host layer | Photopic/ 15 mins activation | $t_{1/2}$ (activation) (s) | $t_{1/2}$ (fade) (s) | $t_{3/4}$ (fade) (s) |
|---|---|---|---|---|
| Commercially available photochromic lens | 0.738 | 23 | 60 | 140 |
| 9G | 0.525 | 11 | 33 | 80 |
| 14G | 0.56 | 10 | 34 | 80 |
| PTMG | 0.645 | 11 | 34 | — |

Example 2

Further coating and lens compositions are provided in Table 3. In each case, the lens was produced using the method described in example 1. This example demonstrates the use of a different lens substrate composition to example 1. In particular the lens substrate in this example is hostile to photochromic compounds in that the polymer is highly cross linked which tends to slow down the activation and fading of the photochromic compound and it is also relatively high in sulphur which tends to degrade photochromic compounds.

TABLE 3

| | Amount (wt %) |
|---|---|
| Material for photochromic host layer | |
| 14G | 66 |
| NS110 | 34 |
| Vicure 55 | 5 |
| Leveling agent BYK 371 | 1 |
| Tinuvin 765 | 0.05 |
| UV 5411 | 0.1 |
| Lens substrate composition | |
| Triphenyl phosphine | 0.05 |
| Lucirin TPO | 0.5 |
| TAIC | 47.54 |
| GST | 52.46 |
| DHBP | 0.1 |

Host layer: Spin speed 600 rpm, UV cure at 4.5 ft/min
Substrate is cured: 3.5 ft/min 2 times (one front and one back) with a V lamp Example 3

Further coating and lens compositions are provided in Table 4. In each case, the lens was produced using the method described in example 1.

TABLE 4

| | Amount (wt %) |
|---|---|
| Material for photochromic host layer | |
| 14G | 70 |
| NS110 | 30 |
| Vicure 55 | 3 |
| Leveling agent BYK 371 | 0.1 |
| Substrate composition | |
| Type S | 75 |
| GST | 25 |
| DHBP | 0.1 |
| Irgacure 819 | 0.9 |

UV cure of substrate is 3 ft/min, 2 times (one front and one back); V lamp
Refractive Index = 1.62
Abbe = 37

Examples 4 to 9

Table 5 shows further formulations that were used in the process of the present invention. In the table, the quantities of material are given in wt % and the coatings were applied as for Example 1.

TABLE 5

| Example | 9G | 14G | U6HA | DATP | PTMG | Irgacure 651 |
|---|---|---|---|---|---|---|
| 4 | 95 | 0 | 5 | 0 | 0 | 5 |
| 5 | 90 | 0 | 10 | 0 | 0 | 5 |
| 6 | 90 | 0 | 0 | 10 | 0 | 5 |

TABLE 5-continued

| Example | 9G | 14G | U6HA | DATP | PTMG | Irgacure 651 |
|---------|----|----|------|------|------|--------------|
| 7 | 0 | 100 | 0 | 0 | 0 | 5 |
| 8 | 100 | 0 | 0 | 0 | 0 | 5 |
| 9 | 0 | 0 | 0 | 0 | 100 | 5 |

Table 6 shows the results of the photochromic performance of the lenses of Examples 4 to 9. In the table the steel wool abrasion test data refers to lenses that were coated with a standard siloxane hard coat and cured before abrasion testing.

TABLE 6

| Example | $t_{1/2}$ (activation) (s) | $t_{1/2}$ (fading) (s) | Optical density | Nanoindentation depth (nm) | Steel Wool Abrasion |
|---------|---------|---------|---------|---------|---------|
| 4 | 12 | 35 | 0.519 | 6200 | Fail |
| 5 | 23 | 42 | 0.607 | 3890 | Pass |
| 6 | 13 | 39 | 0.551 | 6243 | Fail |
| 7 | 10 | 34 | 0.559 | 10000 | Fail |
| 8 | 11 | 34 | 0.523 | 7423 | Fail |
| 9 | 11 | 34 | 0.645 | 15200 | Fail |

Examples 10 to 14

Measurement of Photochromic Performance

We have found that the nanoindentation depth of a coated lens provides an indication of the activation half life or the photochromic performance of a coated lens. As previously discussed, a relatively non-rigid or 'soft' local environment in the photochromic host layer is thought to allow sufficient flexibility and room for the photochromic compound molecules to move into the activated state. This is thought to lead to an increase in photochromic performance.

In Examples 10 to 14 the Barcol hardness of monolithic lenses was correlated with the nanoindentation depth of the monolithic lenses. The Barcol hardness is a macro-indentation method that provides information about the softness of a lens at about 100 micron depth in the lens. In contrast, measurement of the nanoindentation depth is only sensitive to the top 1 to 20 microns of the lens.

It has previously been shown that the Barcol hardness of a lens can be correlated with the photochromic performance of the lens (see International patent application WO0172851).

We have found that there is a correlation between the nanoindentation depth and the Barcol hardness of a cast lens. If a monolithic lens is cast using the coating material there is a good correlation between the nanoindentation depth of the cast lens and the Barcol hardness of the cast lens. This is because a cast lens has the same composition where the Barcol hardness is being measured as it does at the top layer where the nanoindentation depth is measured. Measurement of the Barcol hardness of lenses that are formed using the method of the present invention therefore only provides hardness values of the lens substrate monomer and not the photochromic host layer.

We were able to show that the photochromic performance is correlated to nanoindentation depth. The nanoindentation depth of lenses having the compositions shown in Table 7 was measured using a UMIS 2000 which is available through the Division of Applied Physics of CSIRO Australia. Different indenter tips may be used, but a half spherical tip of radius 5 micron was generally used. The experiments were performed using a force controlled method where the indentation curves as a function of applied force up to a determined maximum force (for example 10 mN) were studied. The nanoindentation depth, photochromic performance and abrasion resistance for the coated lenses are provided in Table 8. The abrasion resistance data shown in Table 8 refers to a lens that has been coated with a standard siloxane hard coat and cured prior to abrasion testing.

TABLE 7

| Example | 14G | NS110 | Irgacure 651 |
|---------|-----|-------|--------------|
| 10 | 88 | 12 | 0.5 |
| 11 | 82 | 18 | 0.5 |
| 12 | 70 | 30 | 0.5 |
| 13 | 68 | 32 | 0.5 |
| 14 | 66 | 34 | 0.5 |

TABLE 8

| Example | $t_{1/2}$ (activation) (s) | $t_{1/2}$ (fading) (s) | Optical Density | Nanoindentation depth (nm) | Steel wool abrasion resistance |
|---------|---------|---------|---------|---------|---------|
| 10 | 12 | 40 | 0.613 | 8880 | Fail |
| 11 | 13 | 42 | 0.599 | 8145 | Fail |
| 12 | 15 | 46 | 0.604 | 5738 | Pass |
| 13 | 17 | 51 | 0.598 | 4822 | Pass |
| 14 | 17 | 54 | 0.617 | 4081 | Pass |

As the data in Table 8 shows, as the nanoindentation depth decreases the photochromic performance of the lens becomes slower. FIG. 1 shows the correlation between nanoindentation depth and darkening times.

This data indicates that the optimal nanoindentation depth of a lens of the present invention, given that it should have reasonable abrasion resistance and fast photochromics, may be between 9000 nm to 2500 nm.

We also found that the nanoindentation depth may also give an indication of the abrasion resistance of a hard coated lens. It has been found that the abrasion resistance of a hard coated lens is dependent to some degree on the material onto which the hard coating is applied. Generally, the softer the photochromic host layer the poorer the abrasion resistance of the lens even after it has been over coated with a conventional hard coat.

Example 15

Multiple Layer Coatings

It may be thought that the thicker a 'soft' coating such as the photochromic host layer is, the worse the abrasion resistance of the coating. However, we found that the abrasion resistance was somewhat independent of the thickness of the photochromic host layer. This suggested that it may be possible to apply multiple layers of coating without reducing the subsequent abrasion resistance of the lens. Table 9 describes different curing and coating conditions used for a 64% 14G, 36% NS110, 0.5% Irgacure 651 (photointitator), 0.12% terpinolene and 0.1% DHBP lens and provides the measured nanoindentation depths and abrasion ratios.

TABLE 9

| Curing and coating conditions | Nanoindentation depth (nm) | Steel wool abrasion ratio |
|---|---|---|
| 700 rpm (UV = 5 ft/min) | 8274 | 1-pass |
| 285 rpm (UV = 5 ft/min) | 6850 | 1.2-pass |
| 285 rpm, additional 3 ml while spinning (UV = 5 ft/min) | — | 1.3-pass |
| 285 rpm, 3 coats (UV = 10 ft/min) | 7390 | 1.1-pass |

Note:
the ft/min data refers to belt speed upon UV curing with a V lamp

Examples 16 to 21

Dual Cure Coating

It may be desirable in some cases to dual cure the photochromic host layer, where the layer is partially cured before setting into the lens and after the substrate is cured, the layer is still not fully converted. This allows the photochromic compound to diffuse into the photochromic host layer and allows room for the photochromic compound to move before the layer is cured to full conversion. This causes the layer to become more rigid during the imbibition process and hence have better abrasion resistance, Dual cure coating requires the use of chain transfer agents which may be selected from mercaptans, allylics, styrene derivatives, terpinolene and mixtures thereof.

We have been able to show that it is possible to dual cure the coating where the initial nanoindentation depth and final nanoindentation depth are significantly different. Generally, when terpinolene and a photoinitiator is used, the layer becomes almost fully converted. When the layer is fully converted, the nanoindentation depth before imbibition of the photochromic host layer with photochromic compound is generally higher than after imbibition. This is thought to be due to relaxation of the UV cured monomer on the photochromic host layer when the lens is heated up to imbibition temperature. Thus, it is not usual that the difference in the nanoindentation depth before and after imbibition is more than a few hundred nanometers. The differences are generally around 200 nm to 11000 nm, with the nanoindentation depth after imbibition lower than before imbibition. The results are shown in Table 10. All of the formulations of Examples 16 to 21 contained 0.5% BYK 371, and were spin coated at a spinning speed 285 rpm.

TABLE 10

| Example | 14G | NS110 | % Irgacure 651 | % terpinolene | % DHBP | UV curing conditions |
|---|---|---|---|---|---|---|
| 16 | 60 | 40 | 0.1 | 0.5 | 0.5 | 10 ft/min |
| 17 | 60 | 40 | 0.5 | 0.5 | 0.5 | 5 ft/min |
| 18 | 60 | 40 | 0.5 | 0.5 | 0.5 | 25 mm/s |
| 19 | 60 | 40 | 0.5 | 0.3 | 0.5 | 5 ft/min |
| 20 | 60 | 40 | 0.5 | 0.4 | 0.4 | 5 ft/min |
| 21 | 50 | 50 | 0.5 | 0.5 | 0.5 | 5 ft/min |

The nanoindentation depths before and after imbibition are shown in Table 11. The imbibition conditions were 135-140 degrees Celsius for four hours.

TABLE 11

| Example | Nanoindentation depth (before imbibition) | Nanoindentation depth (after imbibition) |
|---|---|---|
| 16 | 16350 | 5080 |
| 17 | 10000 | 6950 |
| 18 | 12000 | 6500 |
| 19 | 6600 | 5400 |
| 20 | 9830 | 8200 |
| 21 | 6900 | 6250 |

Example 22

Barrier Layers

After the photochromic host layer is spin coated onto a mould section and the mould section assembled in a gasket, the gasket can then be filled with the substrate of choice. In the present example, Spectralite™ was used. However it was found that it is possible for the photochromic host layer to be penetrated by the substrate monomer once the two are in contact. The occurrence or extent of the breakthrough of substrate monomer into the photochromic host layer is dependent on the degree of cure of the host layer and the composition of the host layer. Generally, the harder the resultant host layer the less breakthrough occurs in the same amount of time. Table 12 shows the effect of photoinitiator content on the nanoindentation depth and the photochromic performance of a 9G in-mould coated lens.

For comparison, a cast lens using 100% 9G is a very soft lens, whereas Spectralite™ is reasonably hard and rigid by comparison; the nanoindentation depths are 15000 nm and 2000 nm, respectively.

As the percentage of photoinitiator increases, the host layer is better sealed with higher cure and the top layer of the lens becomes more like pure 9G, which has a darkening time of 9 seconds as a cast lens. Thus the nanoindentation method can be used (1) as an indicator of whether the host layer had been breakthrough by the substrate monomers, and (2) to measure how soft the actual top layer of host layer is.

Breakthrough of substrate monomer into the photochromic host layer causes an apparent decrease in the coating thickness which therefore decreases the volumetric environment for the photochromic compound. This leads to a harder coating and a decrease in the total amount of photochromic compound uptake.

It is also possible that as the host layer gets glassier by addition of a rigid monomer, the host layer becomes more rigid and is more difficult for the substrate monomer to breakthrough. Hence it is expected that there may be an optimum amount of rigid monomer that may be used in a host layer, particularly in the case of a monomer which is both rigid and viscous and thus increasing the thickness of the actual host layer at a particular spin coating speed.

The data in Table 12 also shows an increase in OD (optical density) when breakthrough is minimised by increasing the amount of photoinitiator in a lens made of 100% 9G monomer.

TABLE 12

| Photoinitiator (wt %) | $t_{1/2}$ (activation) (s) | $t_{1/2}$ (fading) (s) | Optical Density | Nanoindentation depth (nm) |
|---|---|---|---|---|
| 0.5 | 42 | 140 | 0.399 | 2000 |
| 1.0 | 14 | 42 | 0.547 | 2693 |
| 2.0 | 11 | 34 | 0.523 | 7974 |

Another example of breakthrough occurs with a substrate composition such as MR-7, which is a thermally cured substrate that is not imbibable. The MR-7 monomer is low viscosity and takes hours to reach gelation. Thus the time of contact for the photochromic host layer and the substrate monomer is very long and the time involved easily allows breakthrough to occur. When MR-7 is used depending on the exact composition of the host layer, the resulting lens is either not imbibable or very slow due to breakthrough.

Breakthrough can be overcome by using a barrier layer, which may be a highly crosslinked material or one sufficiently rigid to prevent penetration of the substrate monomer into the coating.

Table 13 provides an example of a barrier layer.

TABLE 13

| | Amount (wt %) |
|---|---|
| Materials for coating | |
| A9200 | 30 |
| NK ester A 400 | 70 |
| Lucirin TPO (phototinitiator) | 2 |
| Leveling agent BYK 371 | 0.6 |
| Materials for barrier layer | |
| Pentaerythritol tetrakis-3-mercapto propionate | 59.5 |
| Lucirin TPO | 0.5 |
| Levelling agent (BYK-371) | 0.6 |
| Triallyl isocyanurate | 40.5 |

The procedure for applying the barrier layer was as follows. Initially the coating was UV cured (V-globe) @ 3 ft/min. The barrier layer material was then applied on top of the photochromic host layer and subsequently UV-cured using the same conditions as the photochromic host layer cure. The substrate in this example was MR-7 which is a commercially available monomer with an index of 1.67.

Table 14 provides details of another barrier layer composition.

TABLE 14

| Materials for barrier layer | Amount (wt %) |
|---|---|
| Xylene di isocyanate | 52 |
| Di butyl tin chloride (DBTC) | 0.1 |
| Levelling agent (BYK-371) | 0.6 |
| 4-Mercapto methyl-3,6-di thia-1,8-octane di thiol | 48 |

This particular barrier layer example is at stoichiometric ratio for the thiol and isocyanate. This can be altered to suit a particular requirement for the substrate. In some cases, it may be desirable to have a non-stoichiometric ratio so there is an excess of one component such that the reactive functional group may react with the substrate monomer. The percentage of the DBTC (catalyst) may also be changed as appropriate.

Finally, it will be appreciated that other variations and modifications may be made to the compositions and methods described herein without departing from the scope of the invention.

The invention claimed is:

1. A method for manufacturing a photochromic article, the method including the steps of:
    forming a photochromic host layer on the casting face of at least one mould section,
    treating the photochromic host layer to minimise damage during subsequent steps,
    filling an assembled mould that includes the mould section having the photochromic host layer with a substrate monomer composition,
    before filling the assembled mould with the substrate monomer composition, applying a barrier layer to the photochromic host layer to minimize penetration of the substrate monomer composition into the photochromic host layer,
    and then, curing the substrate monomer composition to form a solid article that includes the photochromic host layer, and the barrier layer, and
    introducing a photochromic compound into the photochromic host layer either before or after the step of curing the substrate monomer composition.

2. A method as in claim 1 wherein the photochromic host layer has a thickness of between 10 and 150 microns.

3. A method as in claim 2 wherein the photochromic compound is introduced into the photochromic host layer after the solid article has been removed from the mould.

4. A method as in claim 3 wherein the treating the photochromic host layer to minimize damage during subsequent steps comprises at least partially curing it, and further comprising subsequently completely curing the photochromic host layer either during or after the introduction of the photochromic compound into the photochromic host layer.

5. A method as in claim 1 wherein the photochromic host layer has a thickness of between 25 and 60 microns.

6. A method as in claim 1 wherein the photochromic host layer has a thickness of between 30 and 50 microns.

7. A method as in claim 1 wherein the treating of the photochromic host layer to minimize damage to the photochromic host layer during subsequent steps comprises evaporating a solvent from the photochromic host layer.

8. A method as in claim 1 wherein the photochromic host layer is formed from a monomer composition that forms a relatively non-polar polymer when cured or partially cured.

9. A method as in claim 1 wherein the photochromic article is formed with a photochromic host layer having a Tg of at least 40° Celsius.

10. A method as in claim 1 wherein the photochromic host layer is formed from a monomer composition that contains any one or more of: alkylene mono- or poly(meth)acrylates; poly(alkyleneoxide) mono- or poly(meth)acrylates; urethane mono- or poly(meth)acrylates and allyl compounds.

11. A method as in claim 10 wherein the poly(alkyleneoxide) poly(meth)acrylate is a monomer containing a major portion of nonaethylene glycol dimethacrylate.

12. A method as in claim 11 wherein the photochromic host layer is formed from a monomer composition that includes a minor proportion of a hardening monomer that provides rigidity when cured.

13. A method as in claim 12 wherein the hardening monomer is a urethane acrylate, an ethoxylated bisphenol-A dimethacrylate monomer having between 1 and 20 ethoxy groups per molecule or an isocyanurate based poly(meth)acrylate.

14. A method as in claim 13 wherein the hardening monomer is added in amount of 1 to 35% by weight of the photochromic host layer monomer composition.

15. A method as in claim 14 wherein the nanoindentation depth of the photochromic host layer is between about 9000 nm and about 2500 nm.

16. A method as in claim 13 wherein the hardening monomer is added in amount of 5 to 15% by weight of the photochromic host layer monomer composition.

17. A method as in claim 10 wherein the poly(alkylene-oxide) poly (meth)acrylate is a monomer containing a major portion of quatdecaethylene glycol dimethacrylate.

18. A method as in claim 10 wherein the poly(alkylene-oxide) poly (meth)acrylate is a polytetramethylene glycol monomer.

19. A method as in claim 1 wherein the photochromic host layer is formed from a monomer composition that contains an ethoxylated bisphenol-A dimethacrylate monomer having between 1 and 20 ethoxy groups per molecule.

20. A method as in claim 1 wherein the photochromic article is an ophthalmic lens.

21. A method as in claim 20, wherein the cured substrate monomer composition forms a moulded lens, and the cured photochromic host layer forms a photochromic coating thereon.

22. A method as in claim 1 wherein the barrier layer is formed by polymerizing a mixture that includes a compound containing double bonds and a compound containing thiol groups.

23. A method as in claim 1 wherein the barrier layer is formed by polymerizing a mixture that includes a compound containing isocyanate groups and a compound containing thiol, hydroxy or aromatic amine groups.

* * * * *